United States Patent
Roh et al.

(10) Patent No.: US 12,141,024 B2
(45) Date of Patent: Nov. 12, 2024

(54) FAILURE MODE AND EFFECT ANALYSIS SYSTEM BASED ON MACHINE LEARNING

(71) Applicant: VWAY CO., LTD, Seoul (KR)

(72) Inventors: Kyung Hyun Roh, Seoul (KR); Hong Bum Kim, Seoul (KR); Sung Nam Kim, Gyeonggi-do (KR)

(73) Assignee: VWAY CO., LTD, Seoul (KR)

( * ) Notice: Subject to any disclaimer, the term of this patent is extended or adjusted under 35 U.S.C. 154(b) by 0 days.

(21) Appl. No.: 18/032,773

(22) PCT Filed: Jun. 30, 2022

(86) PCT No.: PCT/KR2022/009384
§ 371 (c)(1),
(2) Date: Apr. 19, 2023

(87) PCT Pub. No.: WO2023/128090
PCT Pub. Date: Jul. 6, 2023

(65) Prior Publication Data
US 2024/0264893 A1    Aug. 8, 2024

(30) Foreign Application Priority Data

Jan. 3, 2022  (KR) ........................ 10-2022-0000430

(51) Int. Cl.
*G06F 11/07* (2006.01)
(52) U.S. Cl.
CPC ........ *G06F 11/079* (2013.01); *G06F 11/0709* (2013.01); *G06F 11/0796* (2013.01)

(58) Field of Classification Search
CPC . G06F 11/079; G06F 11/0709; G06F 11/0796
See application file for complete search history.

(56) References Cited

U.S. PATENT DOCUMENTS

| | | | |
|---|---|---|---|
| 11,257,183 B1* | 2/2022 | Katsavounidis | .......... G06T 3/40 |
| 2013/0195420 A1* | 8/2013 | Biggs | ............... H04N 9/8205 |
| | | | 386/230 |
| 2019/0205635 A1* | 7/2019 | Brown | ............... H04N 1/00005 |
| 2019/0324888 A1* | 10/2019 | Evans | ................. G06F 11/0772 |

(Continued)

FOREIGN PATENT DOCUMENTS

| | | |
|---|---|---|
| KR | 1020210031111 A | 3/2021 |
| KR | 102406183 B1 * | 6/2022 |
| WO | 2018092924 A1 | 5/2018 |

OTHER PUBLICATIONS

Kim Tae Wan, Good Luck Marketing System for Online and Offline (translated/non-translated KR 102406183 B1), 2022, pp. 21 (Year: 2022).*

Primary Examiner — Matthew M Kim
Assistant Examiner — Matthew N Putaraksa
(74) Attorney, Agent, or Firm — AVEK IP, LLC (57) ABSTRACT

A failure mode and effect analysis system according to the present invention may include: a failure severity calculation unit for calculating a failure severity by using machine learning on the basis of safety analysis information; a failure frequency calculation unit for calculating a failure frequency by using machine learning on the basis of safety analysis information; and a failure detectivity calculation unit for calculating a failure detectivity by using machine learning on the basis of safety analysis information.

8 Claims, 6 Drawing Sheets

(56) References Cited

U.S. PATENT DOCUMENTS

| | | | |
|---|---|---|---|
| 2021/0303381 A1* | 9/2021 | Baldassarre | G06N 5/04 |
| 2022/0334912 A1* | 10/2022 | Oki | G06F 11/079 |
| 2023/0069434 A1* | 3/2023 | Cheng | H04L 41/16 |
| 2023/0087336 A1* | 3/2023 | Hadlock | G06F 11/008 |
| | | | 714/47.3 |
| 2023/0208443 A1* | 6/2023 | Li | H03M 13/31 |
| 2023/0350714 A1* | 11/2023 | Sekiya | G08G 1/00 |
| 2023/0419121 A1* | 12/2023 | Poms | G06N 20/00 |
| 2024/0036964 A1* | 2/2024 | Wang | G06F 11/0778 |
| 2024/0083450 A1* | 3/2024 | Axmann | B60K 35/00 |
| 2024/0092004 A1* | 3/2024 | Von Beuningen | B29C 45/7693 |

* cited by examiner

FAILURE MODE AND EFFECT ANALYSIS SYSTEM BASED ON MACHINE LEARNING

CROSS-REFERENCE TO RELATED APPLICATIONS

This application is the U.S. national phase of, and claims priority to, International Application No. PCT/KR2022/009384, filed Jun. 30, 2022, which designated the U.S. and which claims priority to Korean Patent Application No. 10-2022-0000430, filed Jan. 3, 2022.

TECHNICAL FIELD

The present invention relates to a failure mode and effect analysis system, and more particularly, to a system for analyzing a failure mode and effect using machine learning.

BACKGROUND ART

Failure Mode and Effect Analysis (FMEA) is a technique for recognizing potential failures and taking an action in advance. It is enacted as a standard in QS9000 and ISO9000, and recognized as a very important area in quality management by many companies.

However, there is a problem in that it is difficult and requires a considerable time in acquiring information using FMEA documents.

Although many inventors have attempted to find a solution to solve this problem, a satisfactory result has not been obtained yet.

DISCLOSURE OF INVENTION

Technical Problem

An object of a failure mode and effect analysis system according to the technical spirits of the present invention is to provide a technique that can recommend severity, frequency, and detectivity of a failure in a machine learning-based FMEA safety analysis.

Another object of the failure mode and effect analysis system according to the technical spirits of the present invention is to minimize human error and provide a fast and accurate system safety analysis by automating calculation of severity, frequency, and detectivity of a failure in the failure mode and effect analysis (FMEA), which is a safety analysis technique.

The technical problems to be solved by the failure mode and effect analysis system according to the technical spirits of the present invention are not limited to the problems mentioned above, and unmentioned other problems will be clearly understood by those skilled in the art from the following description.

Technical Solution

To accomplish the above objects, according to one aspect of the present invention, there is provided a failure mode and effect analysis system comprising: a failure severity calculation unit for calculating a failure severity by using machine learning on the basis of safety analysis information; a failure frequency calculation unit for calculating a failure frequency by using machine learning on the basis of safety analysis information; and a failure detectivity calculation unit for calculating a failure detectivity by using machine learning on the basis of safety analysis information.

The failure mode and effect analysis system according to an embodiment may further comprise a calculation information providing unit for providing a user terminal with at least one calculation information among calculation information on the calculated failure severity, calculation information on the calculated failure frequency, and calculation information on the calculated failure detectivity.

The failure severity calculation unit according to an embodiment may use a machine learning framework that uses open-source neural network libraries.

The failure frequency calculation unit according to an embodiment may use a machine learning framework that uses an end-to-end open-source machine learning platform.

The failure detectivity calculation unit according to an embodiment unit may use a machine learning framework that uses Keras or Tensorflow.

The calculation information providing unit according to an embodiment may transmit information on automated failure analysis and evaluation of input data received from the user terminal to the user terminal.

The calculation information providing unit according to an embodiment may transmit, to the user terminal, at least one among information on new failure modes, information on risk scenarios, and information on optimal risk measures derived on the basis of the input data received from the user terminal.

Advantageous Effects

As the proportion and complexity of developing electronic control devices and software (SW) rapidly increase throughout the electronics and communications device industry, automobile industry, aviation industry, and medical industry in accordance with the 4th industrial revolution, the failure mode and effect analysis system according to an embodiment of the technical spirits of the present invention may minimize failure in the process of developing the system and software (SW) by applying safety analysis techniques for preventing national disasters, catastrophes and accidents, particularly, using Failure Mode and Effect Analysis (FMEA).

The failure mode and effect analysis system according to an embodiment of the technical spirits of the present invention may increases accuracy and reliability of analysis without the need of extensive time and manual works according to the repetitive and qualitative determination in the steps of calculating severity, frequency, and detectivity performed when the FMEA is applied.

However, the effects that can be achieved by the failure mode and effect analysis system according to an embodiment of the present invention are not limited to the effects mentioned above, and unmentioned other effects will be clearly understood by those skilled in the art from the following description.

BRIEF DESCRIPTION OF THE DRAWINGS

In order to more fully understand the drawings cited in this specification, a brief description is provided for each drawing.

BEST MODE FOR CARRYING OUT THE INVENTION

Since the present invention may make various changes and have various embodiments, specific embodiments will be illustrated in the drawings and described in detail through detailed description. However, it should be understood that this is not intended to limit the present invention to the specific embodiments, and includes all modifications, equivalents, and substitutes included in the spirit and scope of the present invention.

In describing the present invention, when it is determined that detailed description of related known techniques may unnecessarily obscure the subject matters of the present invention, the detailed description will be omitted. In addition, numbers (e.g., 1st, 2nd, etc.) used in the process of describing this specification are only identification symbols for distinguishing one component from other components.

In addition, in this specification, when one component is referred to as "connected" or "coupled" to another component, the one component may be directly connected or directly coupled to another component, but unless specifically stated otherwise, it should be understood that they may be connected or coupled via another component in the middle.

In addition, in this specification, a component expressed as '~unit' may mean that two or more components may be combined into one component, or one component may be divided into two or more components by further subdivided functions. In addition, each of the components described below may additionally perform some or all of the functions of other components in addition to the main function of its own, and it goes without saying that some of the main functions performed by each component may be exclusively performed by another component.

Hereinafter, embodiments according to the technical spirits of the present invention will be described in detail in order.

Figure 1:
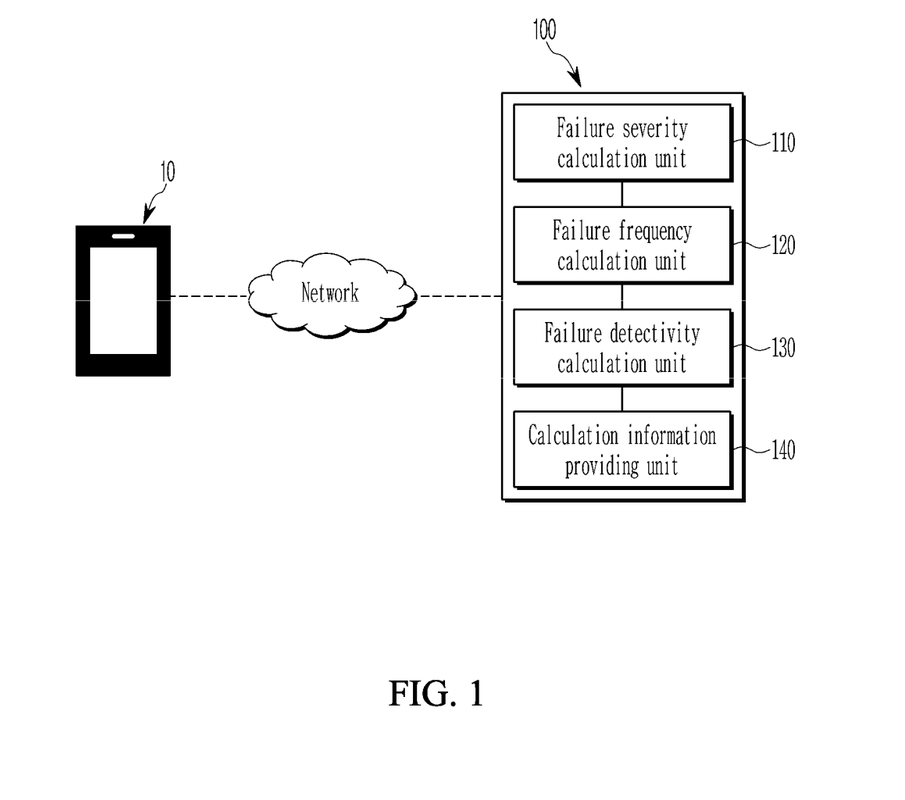
FIG. 1 is a view schematically showing a failure mode and effect analysis system according to an embodiment of the present invention.

FIG. 1 is a view schematically showing a failure mode and effect analysis system according to an embodiment of the present invention.

Referring to FIG. 1, a user terminal 10 may communicate with a failure mode and effect analysis system 100 through a network. The failure mode and effect analysis system 100 may be a computing device that provides services like a server.

According to an embodiment, the network means a connection structure capable of exchanging information between nodes such as a plurality of terminals and servers, and although examples of the network include 3rd Generation Partnership Project (3GPP) networks, Long Term Evolution (LTE) networks, 5G networks, World Interoperability for Microwave Access (WIMAX) networks, the Internet, Local Area Networks (LANs), Wireless Local Area Networks (Wireless LANs), Wide Area Networks (WANs), Personal Area Networks (PANs), Bluetooth networks, satellite broadcasting networks, analog broadcasting networks, Digital Multimedia Broadcasting (DMB) networks, and the like, it is not limited thereto.

The user terminal 10 is, for example, a wireless communication device that guarantees portability and mobility, or a computing device including or connected to a camera, and may include all types of handheld-based wireless communication devices, such as Personal Communication System (PCS) terminals, Global System for Mobile communications (GSM) terminals, Personal Digital Cellular (PDC) terminals, Personal Handyphone System (PHS) terminals, Personal Digital Assistants (PDAS), International Mobile Telecommunication (IMT)-2000 terminals, Code Division Multiple Access (CDMA)-2000 terminals, W-Code Division Multiple Access (W-CDMA) terminals, Wireless Broadband Internet (WiBro) terminals, smartphones, smart pads, tablet PCs, and the like.

According to an embodiment, the failure mode and effect analysis system 100 may include a failure severity calculation unit 110, a failure frequency calculation unit 120, a failure detectivity calculation unit 130, and a calculation information providing unit 140. The failure severity calculation unit 110, the failure frequency calculation unit 120, the failure detectivity calculation unit 130, the calculation information providing unit 140, or other components of the failure mode and effect analysis system 100 may include at least one among a processor, memory, and data transceiver.

The failure severity calculation unit 110 may calculate a failure severity by using machine learning on the basis of safety analysis information.

The safety analysis information may include at least some of all the data related to failure mode and effect analysis, such as safety analysis performance data, failure mode data, and the like.

The failure severity calculation unit 110 may calculate a failure severity, such as a severity when a new safety analysis is performed, on the basis of safety analysis performance data learned through machine learning or deep learning. The calculated failure severity may be recommended through the user terminal or the like using artificial intelligence (AI).

The safety analysis performance data may be learned through machine learning, and the severity may be recommended through AI when a new safety analysis is performed.

The failure frequency calculation unit 120 may calculate a failure frequency by using machine learning on the basis of the safety analysis information.

The failure frequency calculation unit 120 may calculate a failure frequency, such as a frequency when a new safety analysis is performed, on the basis of safety analysis performance data learned through machine learning or deep learning. The calculated failure frequency may be recommended through the user terminal or the like using artificial intelligence (AI).

The safety analysis performance data may be learned through machine learning, and the frequency may be recommended through AI when a new safety analysis is performed.

The failure detectivity calculation unit 130 may calculate a failure detectivity by using machine learning on the basis of the safety analysis information.

The failure detectivity calculation unit 130 may calculate a failure detectivity, such as a detectivity when a new safety analysis is performed, on the basis of safety analysis performance data learned through machine learning or deep learning. The calculated failure detectivity may be recommended through the user terminal or the like using artificial intelligence (AI).

The safety analysis performance data may be learned through machine learning, and the detectivity may be recommended through AI when a new safety analysis is performed.

The calculation information providing unit 140 may provide the user terminal with at least one calculation information among calculation information on the calculated failure severity, calculation information on the calculated failure frequency, and calculation information on the calculated failure detectivity.

According to an embodiment, at least one among the failure severity calculation unit 110, the failure frequency calculation unit 120, and the failure detectivity calculation unit 130 may use a machine learning framework that uses open-source neural network libraries.

According to an embodiment, at least one among the failure severity calculation unit 110, the failure frequency calculation unit 120, and the failure detectivity calculation unit 130 may use a machine learning framework that uses an end-to-end open-source machine learning platform.

According to an embodiment, at least one among the failure severity calculation unit 110, the failure frequency calculation unit 120, and the failure detectivity calculation unit 130 may use a machine learning framework that uses Keras or Tensorflow.

According to an embodiment, the calculation information providing unit 140 may transmit information on automated failure analysis and evaluation of input data received from the user terminal to the user terminal. Information on the automated failure analysis and evaluation may be at least part of all the information obtained by automatically analyzing and evaluating failures of all factors affecting the system or software, such as devices, machines, hardware, software, and the like, by the type. Information on the automated failure analysis and evaluation may include information obtained by evaluating the effect of failures in specific equipment or parts included in the entire system or other components. Information on the automated failure analysis and evaluation is all the information related to the failure analysis and evaluation, and may include a ranking determined according to the severity or the like of an accident, failure frequency, failure impact, damage, criticality, and the like.

According to an embodiment, the calculation information providing unit 140 may transmit, to the user terminal, at least one among information on new failure modes, information on risk scenarios, and information on optimal risk measures derived on the basis of input data received from the user terminal.

Information on new failure modes, information on risk scenarios, and information on optimal risk measures are all the information related to new failure modes, all the information related to risk scenarios, and all the information related to optimal risk measures, and may include at least some of new failure modes, risk scenarios, and optimal risk measures.

Information on new failure modes, information on risk scenarios, and information on optimal risk measures may include at least some of additional protection characteristics, safety measures, and failure measures.

Figure 2:
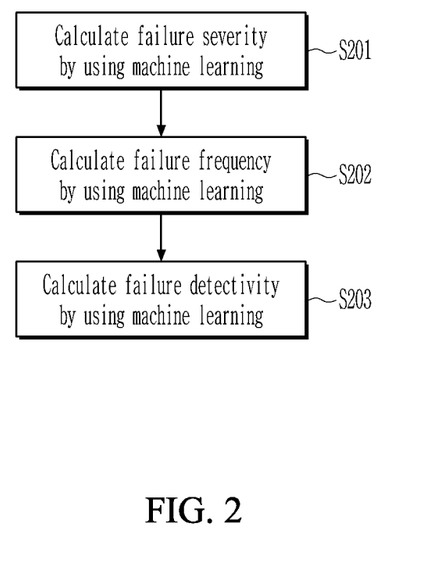
FIG. 2 is a flowchart illustrating the steps of performing a failure mode and effect analysis method executed by a failure mode and effect analysis system according to an embodiment of the present invention.

FIG. 2 is a flowchart illustrating the steps of performing a failure mode and effect analysis method executed by a failure mode and effect analysis system according to an embodiment of the present invention.

Referring to FIG. 2, each step of the failure mode and effect analysis method may be performed by at least one of the components included in the failure mode and effect analysis system. The components of the failure mode and effect analysis system may include a failure severity calculation unit, a failure frequency calculation unit, a failure detectivity calculation unit, and a calculation information providing unit.

At step S201, the failure mode and effect analysis system may calculate a failure severity by using machine learning on the basis of safety analysis information.

At step S202, the failure mode and effect analysis system may calculate a failure frequency by using machine learning on the basis of safety analysis information.

At step S203, the failure mode and effect analysis system may calculate a failure detectivity by using machine learning on the basis of safety analysis information.

The failure mode and effect analysis system may provide the user terminal with at least one calculation information among calculation information on the calculated failure severity, calculation information on the calculated failure frequency, and calculation information on the calculated failure detectivity.

According to an embodiment, the failure mode and effect analysis system may use a machine learning framework that uses open-source neural network libraries.

According to an embodiment, the failure mode and effect analysis system may use a machine learning framework that uses an end-to-end open-source machine learning platform.

According to an embodiment, the failure mode and effect analysis system may use a machine learning framework that uses Keras or Tensorflow.

According to an embodiment, the failure mode and effect analysis system may transmit information on automated failure analysis and evaluation of input data received from the user terminal to the user terminal.

According to an embodiment, the failure mode and effect analysis system may transmit, to the user terminal, at least one among information on new failure modes, information on risk scenarios, and information on optimal risk measures derived on the basis of input data received from the user terminal.

Figure 3:
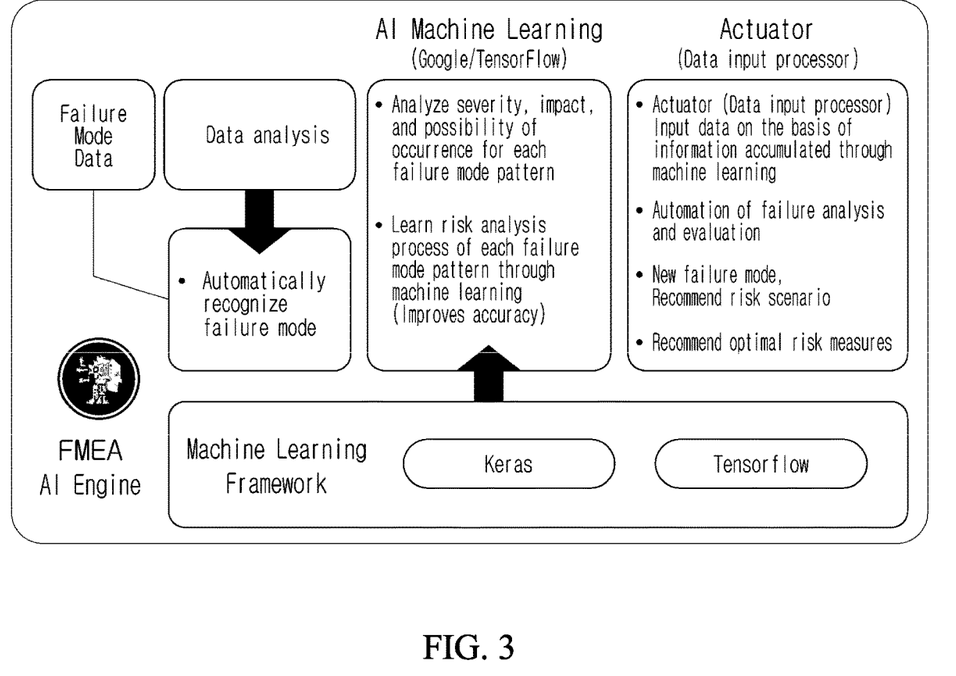
FIG. 3 is a view illustrating the flow of performing the operation of a failure mode and effect analysis system according to an embodiment of the present invention.

FIG. 3 is a view illustrating the flow of performing the operation of a failure mode and effect analysis system according to an embodiment of the present invention.

The failure mode and effect analysis system may include an FMEA artificial intelligence (AI) Engine, or the like.

The failure mode and effect analysis system may further include a safety analysis information management unit for managing safety analysis information, such as failure mode data, by using a database or the like.

The failure mode data may include at least some of the data related to the failure mode, such as critical, false alarm, abnormal instrument reading, breakdown, degrades, false alarm, abnormal instrument reading, erratic output, incipient, external leakage, noise, unknown, number of failures, and failure rate, and the like.

The failure mode and effect analysis system may perform data analysis on the failure mode data, and automatically know or recognize a failure mode.

The failure mode and effect analysis system may analyze the severity, impact, and possibility of occurrence of each failure mode pattern by using AI machine learning or the like.

The failure mode and effect analysis system may improve accuracy by learning a risk analysis process for each failure mode pattern through machine learning by using a machine learning framework or the like that uses or includes Keras, TensorFlow, or the like.

The failure mode and effect analysis system may process input data on the basis of information accumulated through machine learning by using a data input actuator or the like. The failure mode and effect analysis system may perform failure analysis evaluation automation, and recommend new failure modes, risk scenarios, optimal risk measures, and the like.

Meanwhile, for the security of the calculation information transmitted from the calculation information providing unit 140 to the user terminal 10, the calculation information providing unit 140 may convert the calculation information into a digital signal, and the calculation information providing unit 140 may include a rotation key creation module for randomly generating a rotation start number considering the sequence of the entire digital signal, and rearranging, when the sequence number of the digital signal increases by 1 starting from 1 of the first digital signal, and the last digital signal is natural number D, a digital signal having a sequence number smaller than the rotation start number to be placed behind the last digital signal; a first rotation dispatching module for transmitting the rotated entire digital signal to the user terminal 10; and a second rotation dispatching module for transmitting the rotation start number to the user terminal 10. The user terminal 10 may include a rotation reassembly module for receiving the rotated entire digital signal and the rotation start number transmitted to the user terminal 10, and generating a reversed digital signal by reversing the rotated entire digital signal according to the rotation start number.

For example, when the entire digital signal is "0101111011", and the rotation start number is 4, the rotated entire digital signal becomes "1111011010", and the reverse rotated entire digital signal becomes "0101111011".

Meanwhile, for the security of the calculation information transmitted from the calculation information providing unit 140 to the user terminal 10, the calculation information providing unit 140 may convert the calculation information into an image, and the calculation information providing unit 140 may include a key creation module for dividing an image data signal to generate a plurality of image data pieces, assigning an address to each of the image data pieces, and generating a combination rule considering the addresses; a first dispatching module for transmitting the plurality of image data pieces to the user terminal 10 in an arbitrary order; and a second dispatching module for transmitting the combination rule to the user terminal 10. The user terminal 10 includes a reassembly module for receiving the plurality of image data pieces and the combination rule transmitted to the user terminal 10, and generating image data by combining the plurality of image data pieces according to the combination rule. For the security of information on the automated failure analysis and evaluation transmitted from the calculation information providing unit 140 to the user terminal 10, the calculation information providing unit 140 may convert information on the automated failure analysis and evaluation into a digital signal, and the calculation information providing unit 140 may include a rotation key creation module for randomly generating a rotation start number considering the sequence of the entire digital signal, and rearranging, when the sequence number of the digital signal increases by 1 starting from 1 of the first digital signal, and the last digital signal is natural number Di, a digital signal having a sequence number smaller than the rotation start number to be placed behind the last digital signal; a first rotation dispatching module for transmitting the rotated entire digital signal to the user terminal 10; and a second rotation dispatching module for transmitting the rotation start number to the user terminal 10. The user terminal 10 may include a rotation reassembly module for receiving the rotated entire digital signal and the rotation start number transmitted to the user terminal 10, and generating a reversed digital signal by reversing the rotated entire digital signal according to the rotation start number.

Alternatively, for the security of the calculation information transmitted from the calculation information providing unit 140 to the user terminal 10, the calculation information providing unit 140 may convert the calculation information into an image, and the calculation information providing unit 140 may include an axis lining module for setting n first axis lines in the horizontal direction and m second axis lines in the vertical direction in the image (here, n and m are natural numbers); a filing module for performing a filing rule including the steps of selecting any one among the first axis lines and the second axis lines, generating a first filed image by rotating an image on any one side of the selected axis line (hereinafter, referred to as a "first selected axis line") in any one direction so that image areas on both sides of the first selected axis line may be overlapped in two layers, selecting another one among the first axis lines and the second axis lines, and generating a second filed image by rotating a first filed image on any one side of the selected another one axis line (hereinafter, referred to as a "second selected axis line") in any one direction so that first filed image areas on both sides of the second selected axis line may be overlapped in two layers; a first dispatching module for transmitting the second filed image to the user terminal 10; and a second dispatching module for transmitting the filing rule to the user terminal 10. The user terminal 10 includes a reassembly module for receiving the second filed image and the filing rule transmitted to the user terminal 10, and generating an image by restoring the second filed image according to the filing rule. For the security of information on a new failure mode transmitted from the calculation information providing unit 140 to the user terminal 10, the calculation information providing unit 140 may convert information on the new failure mode into a digital signal, and the calculation information providing unit 140 may include a rotation key creation module for randomly generating a rotation start number considering the sequence of the entire digital signal, and rearranging, when the sequence number of the digital signal increases by 1 starting from 1 of the first digital signal, and the last digital signal is natural number Di, a digital signal having a sequence number smaller than the rotation start number to be placed behind the last digital signal; a first rotation dispatching module for transmitting the rotated entire digital signal to the user terminal 10; and a second rotation dispatching module for transmitting the rotation start number to the user terminal 10. The user terminal 10 may include a rotation reassembly module for receiving the rotated entire digital signal and the rotation start number transmitted to the user terminal 10, and generating a reversed digital signal by reversing the rotated entire digital signal according to the rotation start number.

Meanwhile, the calculation information providing unit 140 includes a storage module, and the storage module may store the transmitted image in a database. The database is configured as an aggregate of a plurality of sub-databases, and it may be preferable that these sub-databases are configured in a state physically divided. The storage module may include a sniffing module, a code assignment module, a random number creation module, and a dispersing storage module.

The sniffing module arbitrarily divides an image into a plurality of image pieces, and sets the plurality of divided image pieces as a plurality of individual pieces of information. For example, the individual pieces of information may be configured of W1, W2, W3, W4, and W5. The image may be divided and separated in an X-shape or a zigzag shape.

The code assignment module assigns different codes to the plurality of individual pieces of information divided by the sniffing module as described above. These codes are a kind of ID, and for example, codes are assigned as follows, xfd312 to W1, yga187 to W2, frh443 to W3, eiw451 to W4, and ctj323 to W5.

These individual pieces of information, i.e., W1 to W5, are separately stored in the sub-databases, which are individual physical spaces, and before the individual pieces of information are stored, the random number creation module allows the code of each individual piece of information, i.e., xfd312 of W1, yga187 of W2, frh443 of W3, eiw451 of W4, and ctj323 of W5, to share the same random variable for a predetermined time period.

For example, i) the same random variable wesdispdy2471738 is shared among code xfd312 of W1, code yga187 of W2, code frh443 of W3, code eiw451 of W4, and code ctj323 of W5 between 11:30:00 and 11:30:20, and i) the same random variable qartfrebh5243421 is shared among code xfd312 of W1, code yga187 of W2, code frh443 of W3, code eiw451 of W4, and code ctj323 of W5 between 11:30:20 and 11:30:40, and this is repeated thereafter.

When there is a call for the entire image, W1 to W5 constituting the image require a recombination process, and this recombination is mediated through a random variable shared at a corresponding moment.

As described above, the dispersing storage module separately stores a plurality of individual pieces of information, e.g., W1 to W5, in each physically divided database.

For the security of information on the risk scenario transmitted from the calculation information providing unit 140 to the user terminal 10, the calculation information providing unit 140 may convert information on the risk scenario into a digital signal, and the calculation information providing unit 140 may include a rotation key creation module for randomly generating a rotation start number considering the sequence of the entire digital signal, and rearranging, when the sequence number of the digital signal increases by 1 starting from 1 of the first digital signal, and the last digital signal is natural number D3, a digital signal having a sequence number smaller than the rotation start number to be placed behind the last digital signal; a first rotation dispatching module for transmitting the rotated entire digital signal to the user terminal 10; and a second rotation dispatching module for transmitting the rotation start number to the user terminal 10. The user terminal 10 may include a rotation reassembly module for receiving the rotated entire digital signal and the rotation start number transmitted to the user terminal 10, and generating a reversed digital signal by reversing the rotated entire digital signal according to the rotation start number.

Figure 4:
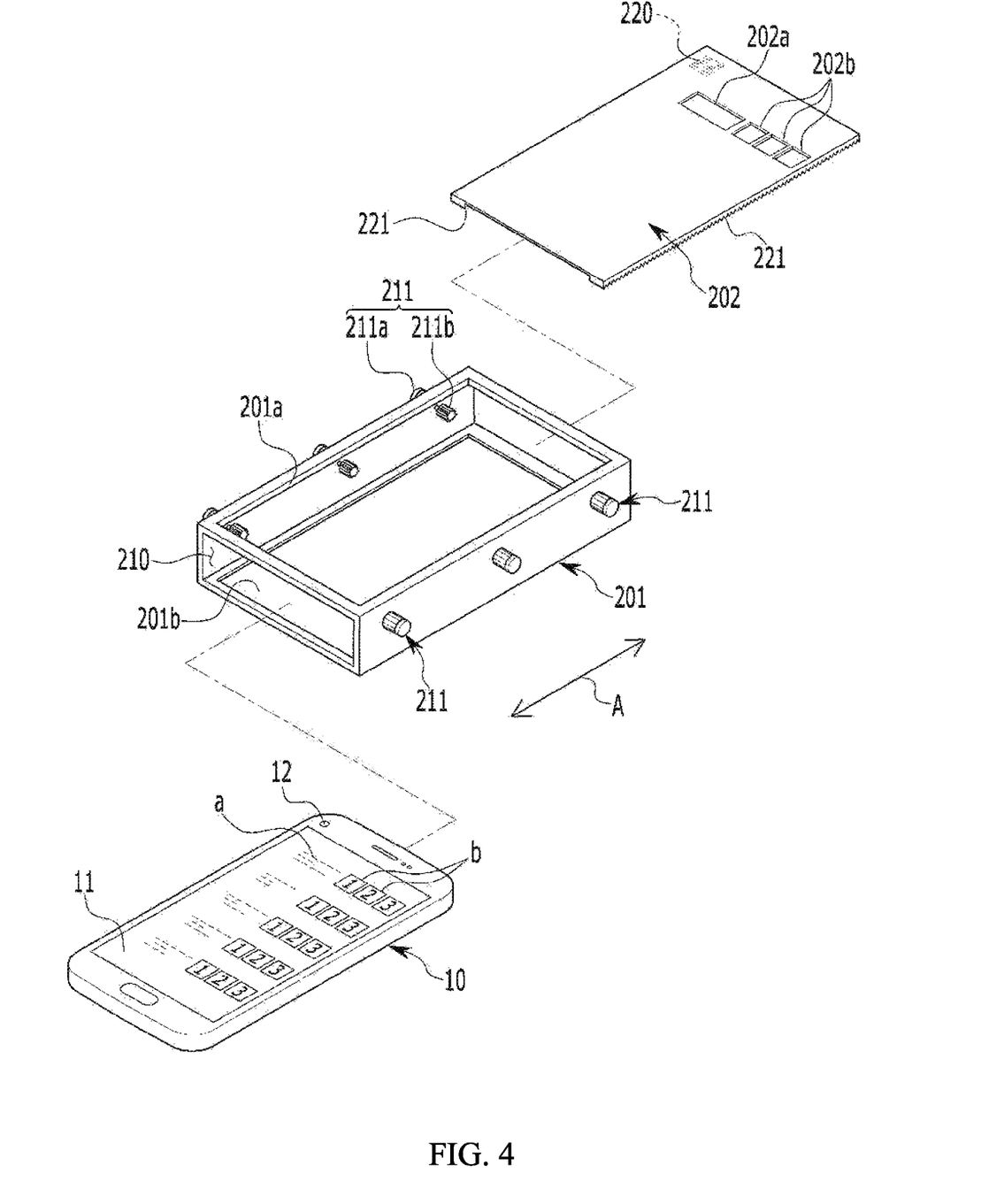
FIG. 4 is a perspective view separately showing an input guide base and an input guide body applied to a user terminal in a failure mode and effect analysis system according to an embodiment of the present invention.
Figure 5:
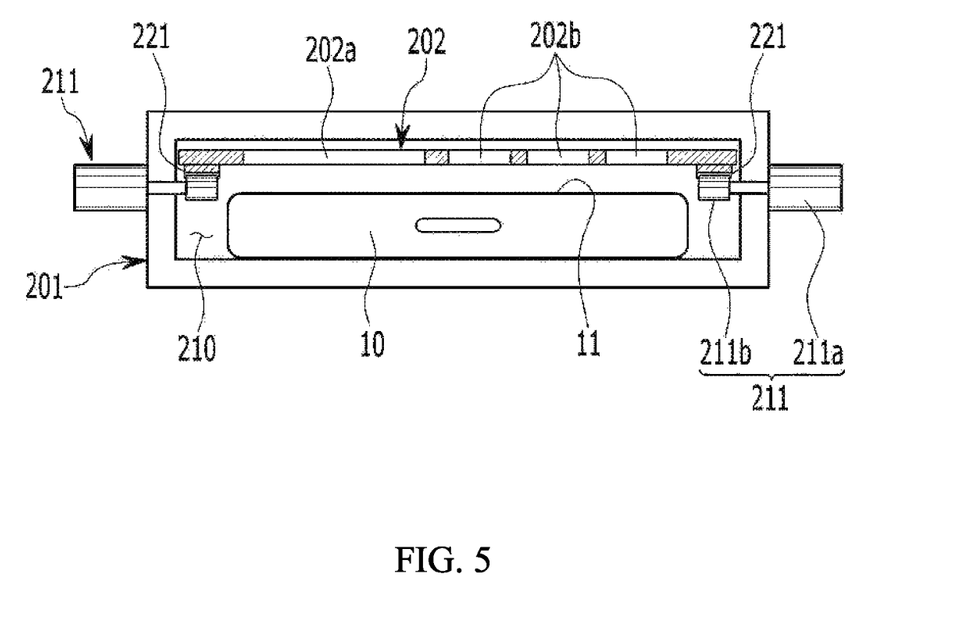
FIG. 5 is a view showing a state of applying an input guide base and an input guide body to a user terminal in a failure mode and effect analysis system according to an embodiment of the present invention.
Figure 6:
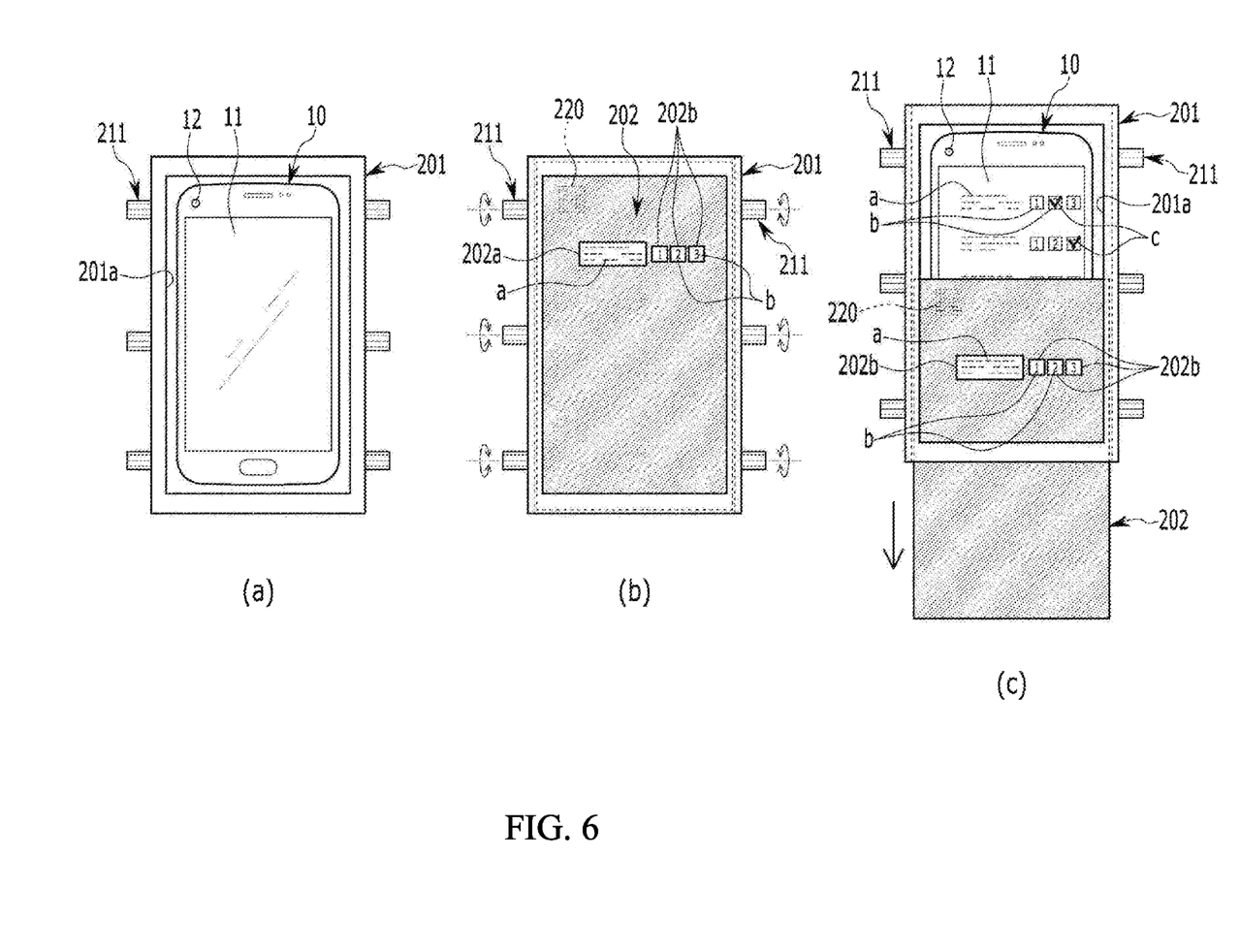
FIG. 6 is a view showing the operation of an input guide base and an input guide body applied to a user terminal in a failure mode and effect analysis system according to an embodiment of the present invention.

FIG. 4 is a perspective view separately showing the input guide base 201 and the input guide body 202 applied to the user terminal 10 in the failure mode and effect analysis system 100 according to an embodiment of the present invention, FIG. 5 is a view showing a state of applying the input guide base 201 and the input guide body 202 to the user terminal 10 in the failure mode and effect analysis system 100 according to an embodiment of the present invention, and FIG. 6 is a view showing the operation of the input guide base 201 and the input guide body 202 applied to the user terminal 10 in the failure mode and effect analysis system 100 according to an embodiment of the present invention.

As shown in FIGS. 4 to 6, the user terminal 10 is combined with the input guide base 201 and the input guide body 202, and may receive data and transmit the data to the failure mode and effect analysis system 100 using the input guide base 201 and the input guide body 202. The data may be used to generate information on failure analysis and evaluation.

The user terminal 10 is configured in the form of a smartphone, and may include a display unit 11 of a display form located on one side of the user terminal 10 and capable of outputting data items a for data and input areas b for inputting numerical values corresponding to the data items a, and a sensing unit 12 of a camera or sensor form spaced apart from the display unit 11 on one side of the user terminal 10 to be located in a first end portion of the user terminal 10. Here, the input area may display and input numerical values that can be selected from the data items, and although it is shown to be configured of three numerical values in this embodiment, it is not limited thereto, and may be configured of three or more, i.e., five, seven, nine, and the like.

The input guide base 201 is configured in a shape corresponding to the user terminal 10 and may detachably accommodate the user terminal 10. An accommodation space 210, a display opening 201*a*, and a mounting space 201*b* may be formed in the input guide base 201.

The accommodation space 210 is configured in a shape corresponding to the user terminal 10 inside the input guide base 201 and may have open end surfaces on both sides. The user terminal 10 may pass through the end surfaces of the accommodation space 210 to be accommodated in the accommodation space 210, and move along one direction A.

The display opening 201*a* may be formed on the top surface of the input guide base 201 and connected to the accommodation space 210. When the user terminal 10 is accommodated in the accommodation space 210, the display unit 11 and the sensing unit 12 of the user terminal 10 may be positioned to correspond to the display opening 201*a*.

The mounting space 201*b* may be concavely formed on the bottom surface of the accommodating space 210 to correspond to the user terminal 10 and may be positioned to correspond to the display opening 201*a*. The user terminal 10 may be accommodated in the accommodation space 210 to be inserted and fixed in the mounting space 201*b*, and the display unit 11 and the sensing unit 12 may be positioned to correspond to the display opening 201*a* and confirmed through the display opening 201*a*.

In addition, the input guide base 201 may be configured of a movement guide 211. The movement guide 211 is formed in plurality, and may be positioned to be spaced apart from each other along one direction A on each of both side surfaces of the input guide base 201. While the user terminal 10 is accommodated in the accommodation space 210, the movement guides 211 may be positioned above the user terminal 10 to be spaced apart from the top surface of the accommodation space 210.

In addition, the movement guide 211 may include a driving body 211a and a rotating body 211b.

The driving body 211a is configured in the form of a motor, and may be positioned on the side surface of the input guide base 201.

The rotating body 211b is configured in the form of a pinion gear, and may be positioned in the accommodation space 210 to be connected to the driving body 211a. Here, the rotating body 211b may be rotated by the driving body 211a.

The input guide body 202 may be configured in a plate shape corresponding to the display opening 201a. Here, the input guide body 202 may be inserted in the accommodation space 210 to be engaged with the movement guide 211 and may be moved by the movement guide 211. A confirmation opening 202a and an input opening 202b may be formed in the input guide body 202.

The confirmation opening 202a may be formed in the input guide body 202 in a size corresponding to one data item a for inputting data that is output on the display unit 11 of the user terminal 10.

The input opening 202b may be formed in the input guide body 202 in a size corresponding to the input area b for inputting data that is output on the display unit 11 of the user terminal 10. Here, the input opening 202b may be positioned on the input guide body 202 to form the same straight line along a direction orthogonal to one direction A in combination with the confirmation opening 202a, and may be formed in plurality to correspond to the input area b.

In addition, an identifier 220 may be formed in a first end portion on the bottom surface of the input guide body 202 (see the upper portion of the input guide body 202 in FIG. 4). Here, the identifier 220 may be configured in the form of a QR code, a bar code, or the like.

While the input guide body 202 is accommodated in the accommodation space 210, the identifier 220 may be positioned to correspond to the sensing unit 12 of the user terminal 10 accommodated in the accommodation space 210. Here, the sensing unit 12 detects the identifier 220, and the display unit 11 may output a plurality of data items a for inputting data corresponding to the identifier and input areas b corresponding to the data items a. In addition, one data item a output in the first end portion of the display unit 11 and the input area b corresponding to the one data item may be confirmed through the confirmation opening 202a and the input opening 202b.

In addition, the input guide body 202 may include a moving body 221.

The moving body 221 is configured as a pair, and may be positioned along one direction A on both sides of the input guide body 202. Here, the moving body 221 may be configured in the form of a rack gear. When the input guide body 202 is inserted in the accommodation space 210, the moving body 221 may be positioned on the rotating body 211b of the movement guide 211 and engaged with the rotating body 211b. Here, the moving body 221 and the rotating body 211b may be engaged in a method of coupling a rack gear and a pinion gear. When the driving body 211a rotates the rotating body 211b, the rotating body 211b may move the input guide body 202 by moving the moving body 221.

The input guide base 201 and the input guide body 202 described above may be applied to the user terminal 10 to operate as follows.

First, the user terminal 10 may be inserted and accommodated in the accommodation space 210 of the input guide base 201 (see FIG. 6(a)). Here, the user terminal 10 may be inserted and fixed in the mounting space 201b, and the display unit 11 and the sensing unit 12 of the user terminal 10 may be positioned to correspond to the display opening 201a.

Subsequently, the input guide body 202 may be inserted and accommodated in the accommodation space 210. Here, the input guide body 202 may be positioned above the user terminal 10, and the moving body 221 may be engaged with the rotating body 211b of the movement guide 211.

When the input guide body 202 is positioned to correspond to the display opening 201a, the identifier 220 may be positioned to correspond to the sensing unit 12. Here, the sensing unit 12 detects the identifier 220, and the display unit 11 may output a plurality of data items a for inputting data corresponding to the identifier 220 and input areas b corresponding to the data items a. In addition, the confirmation opening 202a and the input opening 202b of the input guide body 202 may be positioned to correspond to one data item a output in the first end portion (the upper portion in FIG. 6) of the display unit 11 and an input area b corresponding to the one data item a (see FIG. 6(b)). Here, the user terminal 10 may output the data item a corresponding to the confirmation opening 202a as a voice. That is, a user may easily recognize the data item a and the input area b that should be input through the confirmation opening 202a and the input opening 202b.

In addition, the user may touch the input area b output on the display unit 11 through the input opening 202b. Here, the display unit 11 may output a selection mark c to correspond to the touched input area b, and a numerical value corresponding to the input area b where the selection mark c is output may be input into the user terminal 10 for the data item a. The user terminal 10 may generate an operation signal and transmit it to the input guide base 201. In addition, operation of the movement guide 211 may be performed in the input guide base 201. As the driving body 211a of the movement guide 211 rotates the rotating body 211b, the rotating body 211b may move the moving body 221 to face a second end portion opposite to the first end portion of the display unit 11 (lower portion in FIG. 6). That is, the identifier 220 may be moved to be spaced further apart from the sensing unit 12. Therefore, the confirmation opening 202a and the input opening 202b of the input guide body 202 may be positioned to correspond to another data item a output on the display unit 11 and an input area b corresponding to another data item a, and a portion of the input guide body 202 may be positioned to protrude from the accommodation space 210 (see FIG. 6(c)).

As described above, a user may input data by selectively touching the input areas b one by one for the data items a output on the display unit 11 through the input opening 202b.

As shown in FIG. 6(c), the input guide body 202 is continuously moved by the movement guide 211, and the user may select and touch an input area b for the last data item a among the data items a output on the display unit 11. When the user touches the display unit 11 to select the input area b for the last data item a, the user terminal 10 may generate data including numerical values corresponding to the data items a and the selected input areas b corresponding to the data items a. In addition, the display unit 11 may output a plurality of data items a of different contents for inputting data and input areas b corresponding to the data items a.

In the state as described above, the user terminal 10 may generate a restoration signal and transmit it to the input guide base 201. In addition, operation of the movement guide 211 may be performed in the input guide base 201. As the driving body 211a of the movement guide 211 rotates the rotating body 211b, the rotating body 211b may move the moving body 221 to face the first end portion of the display unit 11 (the upper portion in FIG. 6). Here, the identifier 220 may be moved to approach the sensing unit 12. When the identifier 220 is positioned to correspond to the sensing unit 12 and the sensing unit 12 detects the identifier 220, the user terminal 10 may generate a stop signal and transmit it to the input guide base 201, and the movement guide 211 may be stopped. Here, the confirmation opening 202a and the input opening 202b of the input guide body 202 may be positioned to correspond to one data item a output in the first end portion of the display unit 11 and an input area b corresponding to the one data item a (see FIG. 6(b)). That is, the input guide base 201 and the input guide body 202 may be used to input data while confirming a plurality of data items a of different contents and input areas b corresponding to the data items a.

The failure mode and effect analysis system 100 of the present embodiment may receive data through the user terminal 10 by applying the input guide base 201 and the input guide body 202 to the user terminal 10. Data items a for inputting data output on the display unit 11 of the user terminal 10 and input areas b corresponding to the data items a may be physically identified by the input guide body 202 for one data item a. Therefore, in a state where it is difficult to identify the data item a and the input area b output on the display unit 11 of the user terminal 10, data may be easily input into the user terminal 10 by the user.

The functional operations described in this specification and the embodiments related to the subject matters may be implemented in a digital electronic circuit, computer software, firmware, or hardware, including the structures disclosed in this specification and their structural equivalents, or in a combination of one or more of those.

The embodiments of the subject matters described in this specification may be implemented as one or more modules related to computer program instructions encoded on a tangible program medium to be executed by one or more computer program products, i.e., a data processing device, or to control the operation thereof. The tangible program medium may be a propagation type signal or a computer-readable medium. The propagation type signal is a signal generated to encode information to be transmitted to an appropriate receiver device to be executed by a computer, e.g., an artificially generated signal, such as an electrical, optical, or electromagnetic signal generated by a machine. The computer-readable medium may be a machine-readable storage device, a machine-readable storage substrate, a memory device, a combination of materials that affect a machine-readable propagation type signal, or a combination of one or more of these.

A computer program (also known as a program, software, a software application, a script, or a code) may be written in any form of a programming language, including a compiled or interpreted language, or a priori or procedural language, and may be deployed in any form including stand-alone programs or modules, components, subroutines, or other units suitable for being used in a computer environment.

The computer program does not necessarily correspond to a file of a file system. The program may be stored in a single file provided to a requested program, multiple interacting files (e.g., one or more modules, subprograms, or files that store part of a code), or part of a file storing other programs or data (e.g., one or more scripts stored in a markup language document).

The computer program may be deployed to be executed on one computer or on multiple computers located at one site or distributed across multiple sites and interconnected by a communication network.

Additionally, the logic flows and structural block diagrams described in this specification describe corresponding actions and/or specific methods supported by corresponding functions and steps supported by the disclosed structural means, and may also be used to construct corresponding software structures, algorithms and their equivalents.

The processes and logic flows described this specification may be performed by one or more programmable processors that execute one or more computer programs to perform functions by operating on input data and generating outputs.

Processors suitable for execution of computer programs include, for example, both general and special purpose microprocessors and any one or more processors of any type of digital computers. Generally, a processor will receive instructions and data from read-only memory, random access memory, or both of them.

The core elements of a computer are one or more memory devices for storing instructions and data and a processor for executing the instructions. In addition, the computer is also generally coupled to be operable to receive data from or transmit data to one or more mass storage devices for storing data, such as magnetic, magneto-optical, or optical disks, or to perform both the operations, or will include the storage devices. However, a computer does not need to have such a device.

The description presents the best mode of the present invention, and provides examples to illustrate the present invention and allow those skilled in the art to make and use the present invention. The specification prepared in this way does not limit the present invention to the presented specific terms.

Therefore, although the present invention has been described in detail with reference to the examples described above, those skilled in the art may make alterations, changes and modifications to the present examples without departing from the scope of the present invention. In summary, it does not need to separately include all the functional blocks shown in the drawings or follow all the steps illustrated in the drawings in the shown order in order to achieve the effects intended by the present invention, and it is noted that it may fall within the technical scope of the present invention described in the claims although it does not.

DESCRIPTION OF SYMBOLS

100: Failure mode and effect analysis system
110: Failure severity calculation unit
120: Failure frequency calculation unit
130: Failure detectivity calculation unit
140: Calculation information providing unit

The invention claimed is:

1. A failure mode and effect analysis system comprising:
a failure severity calculation unit for calculating a failure severity by using machine learning on a basis of safety analysis information;
a failure frequency calculation unit for calculating a failure frequency by using machine learning on the basis of safety analysis information;
a failure detectivity calculation unit for calculating a failure detectivity by using machine learning on the basis of safety analysis information;
a calculation information providing unit for providing a user terminal with at least one calculation information among calculation information on the calculated failure severity, calculation information on the calculated failure frequency, and calculation information on the calculated failure detectivity;

wherein the calculation information providing unit transmits information on automated failure analysis and evaluation of input data received from the user terminal to the user terminal, and transmits, to the user terminal, new failure modes, information on risk scenarios, and information on optimal risk measures derived on the basis of the input data received from the user terminal, wherein the information on optimal risk measures includes additional protection characteristics and safety measures; and wherein the calculation information providing unit converts the calculation information into a digital signal, and the calculation information providing unit includes:

wherein the user terminal includes a rotation reassembly module for receiving a rotated entire digital signal and a rotation start number based on the converted digital signal transmitted to the user terminal, and generating a reversed digital signal by reversing the rotated entire digital signal according to the rotation start number.

2. The system according to claim 1, wherein the failure severity calculation unit uses a machine learning framework that uses open-source neural network libraries.

3. The system according to claim 1, wherein the failure frequency calculation unit uses a machine learning framework that uses an end-to-end open-source machine learning platform.

4. The system according to claim 1, wherein the failure detectivity calculation unit uses a machine learning framework that employs at least one open-source library.

5. The system according to claim 1, wherein the user terminal receives data and transmits the data to the failure mode and effect analysis system, and the user terminal includes: a display unit of a display form located on one side of the user terminal and capable of outputting data items for data and input areas for receiving an input of numerical values corresponding to the data items; and a sensing unit of a camera or sensor form spaced apart from the display unit on one side of the user terminal to be located in a first end portion of the user terminal, and the failure mode and effect analysis system further comprises: an input guide base including an accommodation space formed inside to have a shape corresponding to the user terminal, have open end portions on both sides, and accommodate the user terminal, a display opening formed on a top surface to be connected to the accommodation space, a mounting space concavely formed on a bottom surface of the accommodation space to correspond to the user terminal, and a plurality of movement guides positioned to be spaced apart from each other on both side surfaces along one direction; and an input guide body formed in a plate shape, having a confirmation opening and an input opening, and including a pair of moving bodies positioned on both sides along one direction, formed in a shape of a rack gear, and engageable with the movement guide, and the movement guide includes: a driving body of a motor form located on a side surface of the input guide base; and a rotating body of a pinion gear form located in the accommodation space to be connected to the driving body, and capable of being rotated by the driving body and engaged with the moving body, wherein the user terminal is accommodated in the accommodation space, and inserted and fixed in the mounting space, and the display unit and the sensing unit are positioned to correspond to the display opening, and the input guide body is inserted and accommodated in the accommodation space to be positioned above the user terminal, and the moving body and the rotating body of the movement guide are engaged, and when the driving body of the movement guide rotates the rotating body, the moving body is moved, and thus the input guide body moves in the accommodation space, and an identifier is formed in the first end portion of a bottom surface of the input guide body, and when the input guide body is positioned to correspond to the display opening, the identifier is positioned to correspond to the sensing unit and sensed by the sensing unit, the display unit outputs a plurality of data items corresponding to the identifier and input areas corresponding to the data items, and the confirmation opening and the input opening of the input guide body are positioned to correspond to one data item output in the first end portion of the display unit and an input area corresponding to the one data item, and when a user touches the input area output on the display unit through the input opening, the display unit outputs a selection mark to correspond to the touched input area, and the user terminal generates an operation signal and transmits it to the input guide base, and the driving body rotates the rotating body, the moving body is moved to face a second end portion opposite to the first end portion of the display unit, the confirmation opening and the input opening are positioned to correspond to another data item output on the display unit and an input area corresponding to another data item, and a portion of the input guide body is positioned to protrude from the accommodation space.

6. A failure mode and effect analysis system comprising:
a failure severity calculation unit;
a failure frequency calculation unit;
a failure detectivity calculation unit;
a calculation information providing unit for providing a user terminal with at least one calculation information among calculation information on the calculated failure severity, calculation information on the calculated failure frequency, and calculation information on the calculated failure detectivity;

wherein the calculation information providing unit transmits information on automated failure analysis and evaluation of input data received from the user terminal to the user terminal, and transmits, to the user terminal, new failure modes, information on risk scenarios, and information on optimal risk measures derived on the basis of the input data received from the user terminal, wherein the information on optimal risk measures includes additional protection characteristics and safety measures; and wherein the calculation information providing unit converts the calculation information into a digital signal, and the calculation information providing unit includes:

wherein the user terminal includes a rotation reassembly module for receiving a rotated entire digital signal and a rotation start number based on the converted digital signal transmitted to the user terminal, and generating a reversed digital signal by reversing the rotated entire digital signal according to the rotation start number.

7. The system according to claim 6, wherein the failure severity calculation unit uses a machine learning framework that uses open-source neural network libraries.

8. The system according to claim 6, wherein the failure frequency calculation unit uses a machine learning framework that uses an end-to-end open-source machine learning platform.

\* \* \* \* \*